United States Patent
Mitomo et al.

(10) Patent No.: US 10,868,579 B2
(45) Date of Patent: Dec. 15, 2020

(54) DEVICE FOR CONTROLLING RECEIVER TO RECEIVE WIRELESS SIGNAL

(71) Applicant: KABUSHIKI KAISHA TOSHIBA, Minato-ku (JP)

(72) Inventors: Toshiya Mitomo, Yokohama (JP); Kohei Onizuka, Shinagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/294,974

(22) Filed: Mar. 7, 2019

(65) Prior Publication Data
US 2020/0044685 A1 Feb. 6, 2020

(30) Foreign Application Priority Data
Jul. 31, 2018 (JP) ................................. 2018-144299

(51) Int. Cl.
*H04B 1/54* (2006.01)
*H04L 7/02* (2006.01)

(52) U.S. Cl.
CPC .......... *H04B 1/54* (2013.01); *H04L 7/02* (2013.01)

(58) Field of Classification Search
CPC ........ H04B 1/54; H04B 1/38; H01Q 21/0025; H04L 7/02
See application file for complete search history.

(56) References Cited

U.S. PATENT DOCUMENTS

| 4,724,441 A * | 2/1988 | Fithian | G01S 7/034 342/368 |
| 10,044,329 B2 * | 8/2018 | Nonomura | H03F 3/211 |
| 2005/0265650 A1 * | 12/2005 | Priyadarshi | G02B 6/4201 385/14 |
| 2009/0102704 A1 * | 4/2009 | Fujimura | G01S 7/025 342/25 A |
| 2009/0327655 A1 * | 12/2009 | Yoshikawa | G06F 9/3879 712/42 |
| 2010/0265998 A1 * | 10/2010 | Nakada | G01S 7/03 375/219 |
| 2012/0319746 A1 * | 12/2012 | Hayashi | H01Q 3/42 327/141 |
| 2013/0016003 A1 * | 1/2013 | Stirling-Gallacher | H01Q 3/26 342/174 |
| 2014/0064341 A1 * | 3/2014 | Johansson | H04B 1/0007 375/219 |
| 2015/0035714 A1 * | 2/2015 | Zhou | H01Q 13/106 343/767 |
| 2015/0188592 A1 * | 7/2015 | Solondz | H04B 1/3888 455/501 |
| 2018/0316096 A1 * | 11/2018 | Harauchi | H01Q 23/00 |
| 2020/0028561 A1 * | 1/2020 | Leulescu | H04B 7/0691 |

FOREIGN PATENT DOCUMENTS

| JP | 2001-007628 | 1/2001 |
| JP | 3618858 | 2/2005 |
| JP | 6192875 | 9/2017 |

\* cited by examiner

*Primary Examiner* — Devan A Sandiford
(74) *Attorney, Agent, or Firm* — Oblon, McClelland, Maier & Neustadt, L.L.P.

(57) ABSTRACT

According to one embodiment, a wireless device includes a plurality of transmission/reception units and a controller. The each of the plurality of transmission/reception units includes an antenna and is configured to transmit/receive a wireless signal by the antenna. The controller individually controls a frequency of the wireless signal transmitted/received by each of the plurality of transmission/reception units.

11 Claims, 12 Drawing Sheets

DEVICE FOR CONTROLLING RECEIVER TO RECEIVE WIRELESS SIGNAL

CROSS-REFERENCE TO RELATED APPLICATIONS

This application is based upon and claims the benefit of priority from Japanese Patent Application No. 2018-144299, filed on Jul. 31, 2018; the entire contents of which are incorporated herein by reference.

FIELD

Embodiments of the present invention relate to a wireless device.

BACKGROUND

In order to realize an array antenna with a high degree of freedom, a technology in which a plurality of circuit elements, such as amplifier circuits, to supply a signal to each antenna is mounted on the same board and a whole array antenna is configured by combination of modules to feed power by isometric wiring with respect to the antenna has been proposed. Also, a technology in which a whole array antenna is configured with a module including a radome, an antenna, and a transmission/reception circuit has been proposed.

However, a related art is limited to a function only of transmission, or simultaneous reception of signals of the same frequency. Thus, it has been difficult to monitor a radio wave in a wide band.

DETAILED DESCRIPTION

According to one embodiment, a wireless device includes a plurality of transmission/reception units and a controller. The each of the plurality of transmission/reception units includes an antenna and is configured to transmit/receive a wireless signal by the antenna. The controller individually controls a frequency of the wireless signal transmitted/received by each of the plurality of transmission/reception units.

In the following, preferable embodiments of a wireless device according to the present invention will be described in detail with reference to the attached drawings. A wireless device in the following embodiments can be applied to a microwave feeding device that performs wireless power feeding by an electromagnetic wave (microwave), for example. An applicable device is not limited to the microwave feeding device. For example, a wireless device of each embodiment may be applied to a radar device (such as weather radar) that transmits a radio wave and analyzes a reflected radio wave.

As described above, it has been difficult in a related art to monitor a radio wave in a wide band. Thus, for example, in a case where the related art is applied to a use of microwave feeding, monitoring of a radio wave is not performed or monitoring only of a very limited band is performed. Thus, it is not possible to consider an influence on a surrounding existing wireless system and there is a case where communication quality is deteriorated greatly or wireless communication becomes impossible.

Also, since input/output of a high-frequency signal is necessary for each module, there is a possibility that a large phase difference is generated between modules and a phased array function is deteriorated. Also, in a case where the number and configuration of modules are freely selected, problems that oscillation may become unstable, signal leakage may be increased, and an expensive high-frequency connector becomes necessary may be generated, for example.

A wireless device of each of the following embodiments makes it possible to monitor a radio wave in a wide band. Also, output power and an outline size of a wireless device of each embodiment can be freely changed. From this, it becomes possible to reduce a quality deterioration risk with respect to an existing wireless system due to a wireless signal and to acquire a stable operation inexpensively.

First Embodiment

Figure 1:
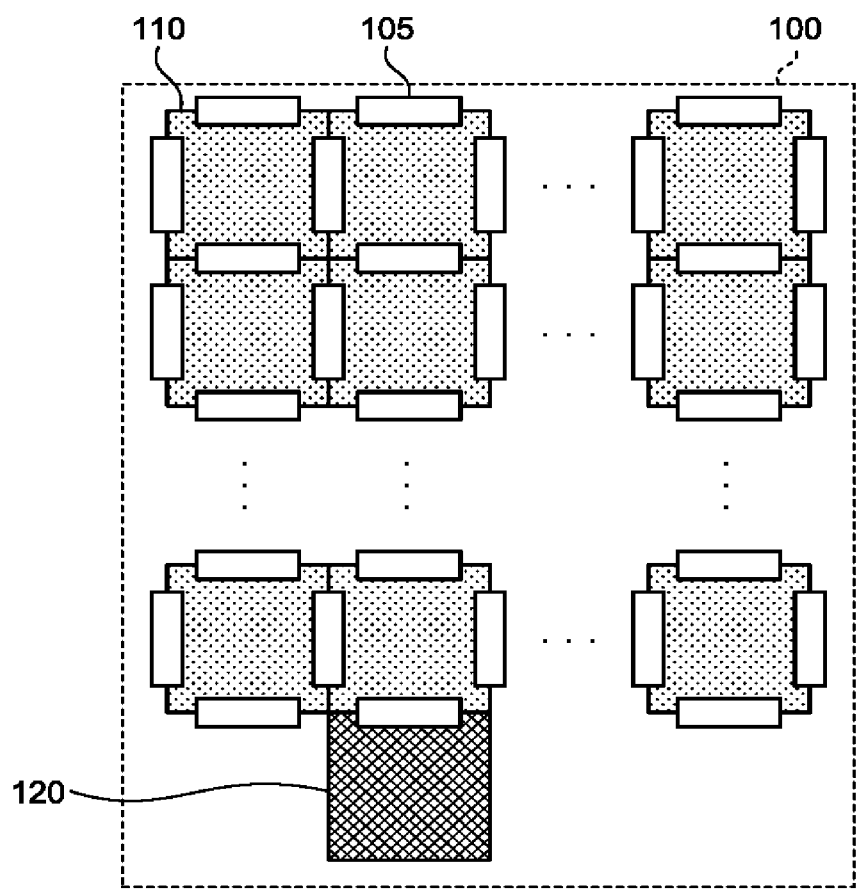
FIG. 1 is a view illustrating a configuration example of a wireless device of a first embodiment.

FIG. 1 is a view illustrating a configuration example of a wireless device 100 of the first embodiment. As illustrated in FIG. 1, the wireless device 100 includes a plurality of transmission/reception modules 110 (example of transmission/reception unit) and a controller 120. Each of the plurality of transmission/reception modules 110 includes a connector 105. In FIG. 1, an example in which the transmission/reception modules 110 are connected in array in a vertical direction and a horizontal direction is illustrated.

Each of the transmission/reception modules 110 is electrically or electrically and mechanically connected to a different transmission/reception module 110 or the controller 120 by the connector 105. At least one transmission/reception module 110 is connected to the controller 120. A signal between the plurality of transmission/reception modules 110, and a signal between the transmission/reception modules 110 and the controller 120 are delivered by the connector 105.

The controller 120 controls an operation of each of the transmission/reception modules 110. For example, the controller 120 controls transmission/reception of a transmission signal, a reception signal, and a control signal with respect to each of the transmission/reception modules 110. The controller 120 individually controls a frequency (transmission/reception frequency) of a wireless signal transmitted/received by each of the transmission/reception modules 110.

Figure 2:
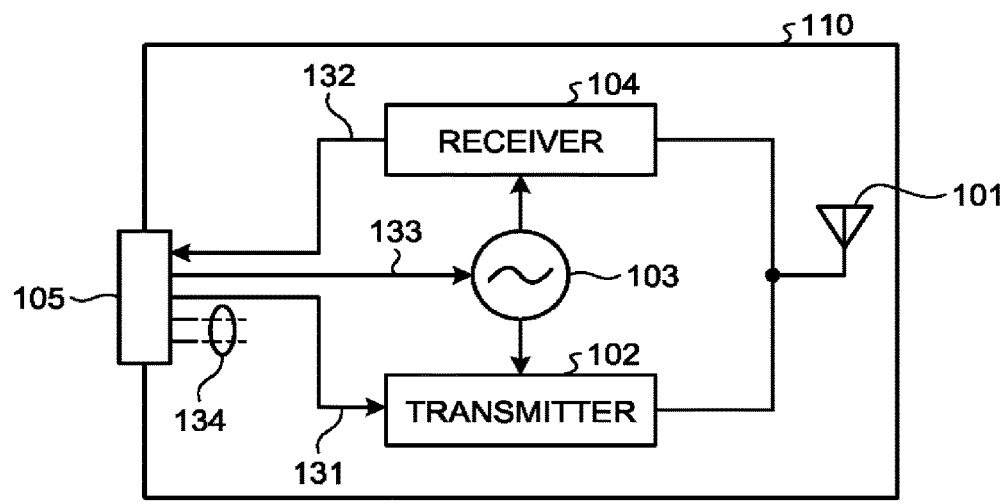
FIG. 2 is a view illustrating a configuration example of a transmission/reception module of the first embodiment.

FIG. 2 is a view illustrating a configuration example of a transmission/reception module 110 of the first embodiment. As illustrated in FIG. 2, the transmission/reception module 110 includes an antenna 101, a transmitter 102, a local oscillation signal generator 103, a receiver 104, and a connector 105.

A transmission signal 131 to the transmitter 102, a reception signal 132 from the receiver 104, and a reference signal 133 of a frequency set in the local oscillation signal generator 103 (frequency reference signal) are input from/output to the outside of the transmission/reception module 110 via the connector 105. A connection wire 134 is used for input/output of a different control signal, a power signal, and the like and for connection to the ground.

The transmission signal 131 corresponds to a configuration of the transmitter 102 and may be any of an analog signal (such as sinusoidal signal, modulation signal, or DC signal) and a digital signal. The reception signal 132 corresponds to a configuration of the receiver 104 and may be any of an analog signal and a digital signal. The reference signal 133 may be any signal as long as being a signal, which determines a frequency of an oscillation signal of the local oscillation signal generator 103, such as a reference clock signal and a frequency control signal.

A frequency of these signals used for control by the controller 120 is set in such a manner that no influence on a wireless signal transmitted/received by the antenna 101 is generated. For example, a frequency of these signals is a frequency set in such a manner that no influence of a distributed constant according to a size of the wireless device 100 is generated. A frequency of these signals can be set, for example, to 1/10 or lower of a frequency of a wireless signal.

The local oscillation signal generator 103 generates a signal of a frequency based on the reference signal 133 (local oscillation signal), the signal being used for conversion of a frequency of a wireless signal.

The transmitter 102 and the receiver 104 are connected to the antenna 101. The transmitter 102 performs modulation or the like of a signal and transmits a modulated wireless signal from the antenna 101. By using a local oscillation signal, the transmitter 102 converts a frequency of the transmission signal 131 into a frequency of the wireless signal transmitted from the antenna 101.

The receiver 104 receives the wireless signal from the antenna 101 and outputs, to the controller 120, the wireless signal on which processing such as demodulation is executed. The receiver 104 converts a frequency of the wireless signal received from the antenna 101 into a frequency of the reception signal 132 by using the local oscillation signal.

The transmitter 102, the local oscillation signal generator 103, and the receiver 104 can be configured as an integrated circuit or a front-end module. Configuration units included in a plurality of transmission/reception modules 110 may be aggregated to one integrated circuit or the like. It becomes possible to reduce the number of components by aggregation of the configuration units in such a manner.

By using the transmission/reception module 110 and the controller 120 configured in the above manner, it becomes possible to change a combination of transmission/reception modules 110 flexibly. That is, it becomes possible to flexibly change output power, a circuit size, and the like of the wireless device 100. Also, a transmission/reception frequency, transmission/reception timing, and the like of each transmission/reception module 110 can be controlled individually by the controller 120. Moreover, since a signal transmitted/received between the transmission/reception modules 110 is limited to a signal of a frequency that does not influence a wireless signal transmitted to/received from the antenna 101, it becomes possible to greatly reduce an influence of when a size of the whole wireless device 100 is increased.

A method by which the controller 120 individually controls each transmission/reception module 110 may be any method. For example, a method of using identification information individually assigned to each transmission/reception module 110 can be applied.

Figure 3:
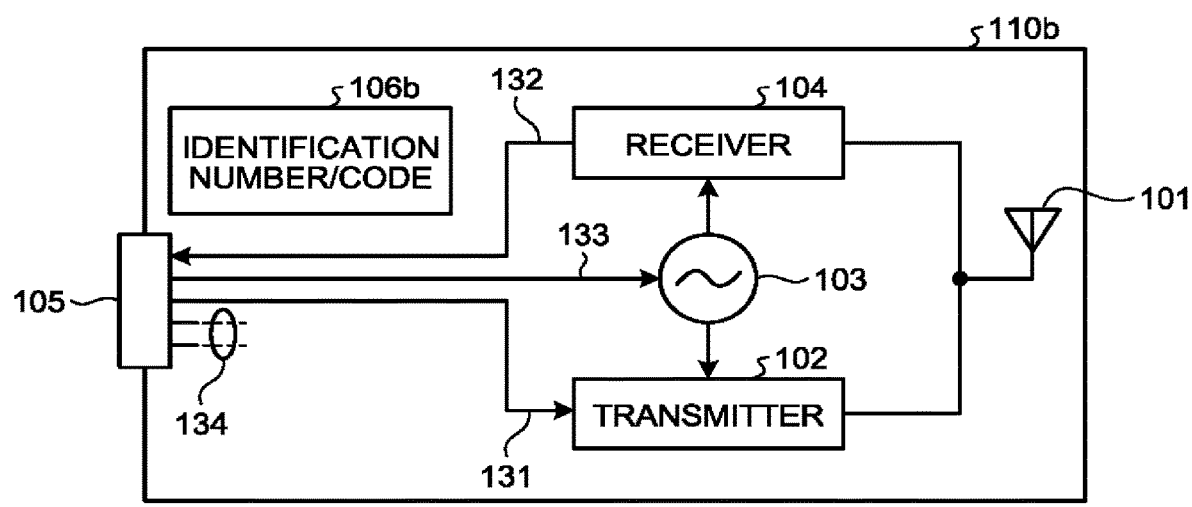
FIG. 3 is a view illustrating a configuration example of the transmission/reception module of the first embodiment.

FIG. 3 is a view illustrating a configuration example of a transmission/reception module 110b of a case where such a method is applied. As illustrated in FIG. 3, the transmission/reception module 110b includes an antenna 101, a transmitter 102, a local oscillation signal generator 103, a receiver 104, a connector 105, and storage 106b.

The storage 106b stores unique identification information (such as identification number or identification code) assigned to a transmission/reception module 110b. Any storage medium such as a non-volatile memory may be used as the storage 106b. The identification information may be stored by utilization of a manual switch (DIP switch).

By using identification information, the controller 120 designates a transmission/reception module 110b to be controlled. For example, while designating an identification number, the controller 120 transmits a signal (such as reference signal) to control a frequency of a wireless signal transmitted/received by the transmission/reception module 110b to which the identification information is assigned. For example, in a case of receiving a signal in which identification information assigned to itself is designated, the transmission/reception module 110b operates based on the received signal.

Instead of utilization of the identification information, for example, the controller 120 may control each transmission/reception module 110 by using an individual special line that connects the controller 120 and each transmission/reception module 110.

Next, an example of individually setting a frequency of a wireless signal of each transmission/reception module 110 will be described. For example, the controller 120 can set a different value, for each transmission/reception module 110, as a reference signal 133 set in a local oscillation signal generator 103 of each transmission/reception module 110. This means that it is possible to set a different value for each transmission/reception module 110 as a frequency of a wireless signal transmitted/received by the transmission/reception module 110.

Figure 4:
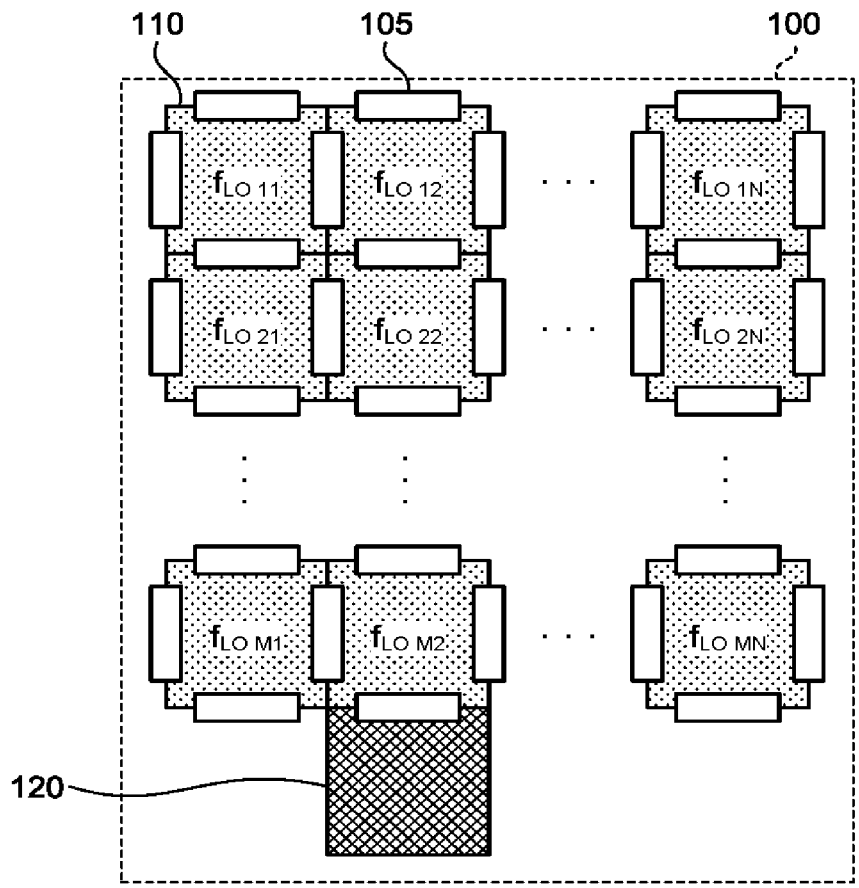
FIG. 4 is a view illustrating an example of a frequency set in the transmission/reception module.

FIG. 4 is a view illustrating an example of a frequency set in each transmission/reception module 110. In FIG. 4, a frequency set in a transmission/reception module 110 in an mth row (1≤m≤M, M is number of row) and an nth column (1≤n≤N, N is number of column) is expressed as $f_{LO_{MN}}$. Note that frequencies may be different values or an equal value.

Figure 5:
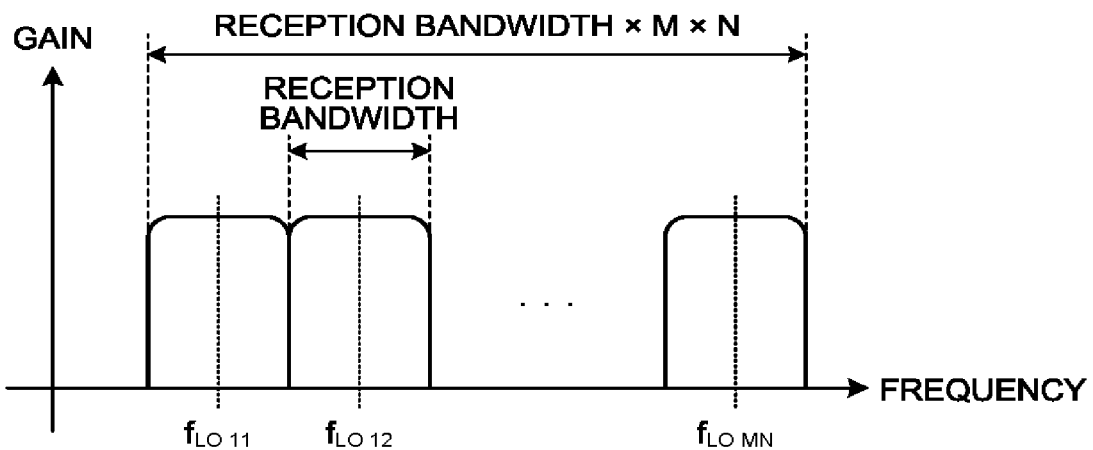
FIG. 5 is a view illustrating an example of a signal spectrum received by a receiver.

FIG. 5 is a view illustrating an example of a signal spectrum received by the receiver 104 of each transmission/reception module 110. In the example in FIG. 5, frequencies $f_{LO11}, f_{LO12}, \ldots,$ and $f_{LOMN}$ are set in a manner of becoming a higher value in this order. The receiver 104 of each transmission/reception module 110 can receive a band signal of a reception bandwidth.

In the example in FIG. 5, since an interval between the frequencies of $f_{LO11}$ to $f_{LOMN}$ is identical to the reception bandwidth, a reception bandwidth in the whole wireless device 100 becomes M×N times of the reception bandwidth of the receiver 104 included in each transmission/reception module 110. Based on a result of this reception signal (radio wave monitoring signal), it becomes possible to easily complete a search for a usable frequency in a band in which a radio wave is not used, or the like in a short period.

Moreover, by setting a plurality of transmission/reception modules 110 to the same frequency after reception of a wireless signal in a wide band, it becomes possible to perform estimation of a coming direction and a propagation path of a signal source at a specific frequency at the same time. For example, when the controller 120 controls a power transmission direction of microwave feeding by using phased array control based on a coming direction or propagation path estimation result, interference with a different wireless system can be reduced.

In such a manner, since it becomes possible to arrange transmission/reception modules including an antenna in freely selected array, it becomes possible to easily realize a configuration corresponding to a demand such as output power in the first embodiment. Also, since a receiving function (receiver) and a local oscillation signal generating function (local oscillation signal generator) mounted in a transmission/reception module can be controlled individually with respect to each transmission/reception module, complicated control such as individually defining a frequency of a received wireless signal becomes possible.

Also, in the first embodiment, only a transmission signal, a reception signal, and a control signal having a frequency adequately lower than a high-frequency wireless signal transmitted/received by an antenna are handled. Thus, it becomes possible to greatly suppress an influence of deterioration in a phased array function, signal reflection, signal loss, and signal leakage by a phase rotation generated due to long wiring across a connector and a whole transmission/reception module.

Also, since it is possible to set a different frequency for each transmission/reception module, simultaneous reception in a plurality of signal bandwidths becomes possible and radio wave monitoring in a wide band can be performed easily in a short period. As a result, for example, by control of time, a frequency, and a transmission direction in microwave feeding, it becomes possible to greatly suppress interference of a wireless device with an existing wireless system.

Second Embodiment

Figure 6:
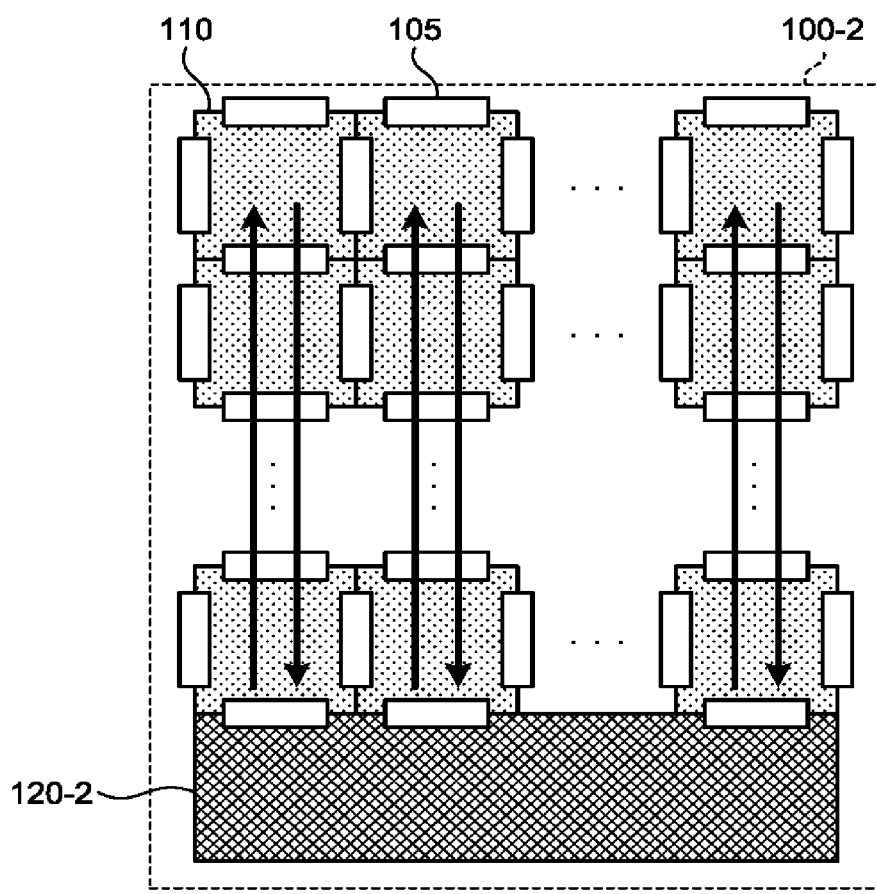
FIG. 6 is a view illustrating a configuration example of a wireless device of a second embodiment.

FIG. 6 is a view illustrating a configuration example of a wireless device 100-2 of the second embodiment. As illustrated in FIG. 6, the wireless device 100-2 includes a plurality of transmission/reception modules 110 and a controller 120-2.

The second embodiment is different from the first embodiment in a point that the controller 120-2 is connected to the plurality of transmission/reception modules 110. The controller 120-2 transmits/receives a transmission signal, a reception signal, and a control signal with respect to each column in an array arrangement via a connector 105.

Note that in a case of a configuration in FIG. 6, each of the transmission/reception modules 110 does not necessarily include a connector for connection in a row direction (horizontal direction in FIG. 6) of the array arrangement. An example of a shape of the connector will be described later.

In the example in FIG. 6, the transmission/reception modules 110 are classified into columns. However, a classification method is not limited to this. That is, the plurality of transmission/reception modules 110 only needs to be classified into any of a plurality of groups. It is only necessary with respect to each of the plurality of groups that one of the transmission/reception modules 110 classified into the group is connected to the controller 120-2. With respect to each group, the controller 120-2 transmits/receives a transmission signal, a reception signal, and a control signal via the connector 105.

The wireless device according to the second embodiment can also realize an effect similar to that of the wireless device of the first embodiment.

Third Embodiment

Figure 7:
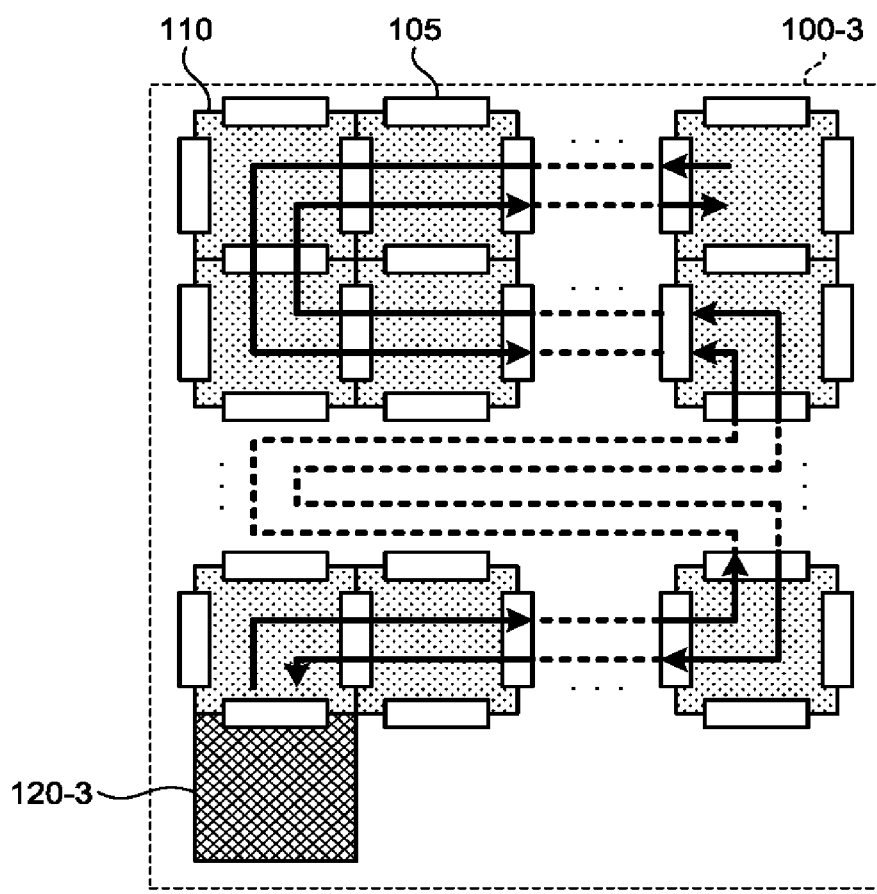
FIG. 7 is a view illustrating a configuration example of a wireless device of a third embodiment.

FIG. 7 is a view illustrating a configuration example of a wireless device 100-3 of the third embodiment. As illustrated in FIG. 7, the wireless device 100-3 includes a plurality of transmission/reception modules 110 and a controller 120-3.

The third embodiment is different from the first embodiment in a point that the controller 120-3 is connected to a lower left transmission/reception module 110. Also, in the third embodiment, the transmission/reception modules 110 are connected in a beaded manner (daisy chain).

Via a connector 105, the controller 120-3 transmits/receives a transmission signal, a reception signal, and a control signal to/from the transmission/reception modules 110 connected in a daisy chain.

The wireless device according to the third embodiment can also realize an effect similar to that of the wireless device of the first embodiment.

Fourth Embodiment

As described above, an input/output signal between a transmission/reception module and a controller has a frequency lower than a frequency of a wireless signal (such as frequency of $\frac{1}{10}$ or lower). However, along with an increase in a size of a wireless device, deterioration in a phased array characteristic due to a delay (phase shift, phase difference, or phase error) between modules is generated and it becomes difficult to perform accurate control. Thus, a wireless device of the fourth embodiment includes a function of detecting a phase of a signal such as a reference signal and a function of correcting a phase difference (delay).

Figure 8:
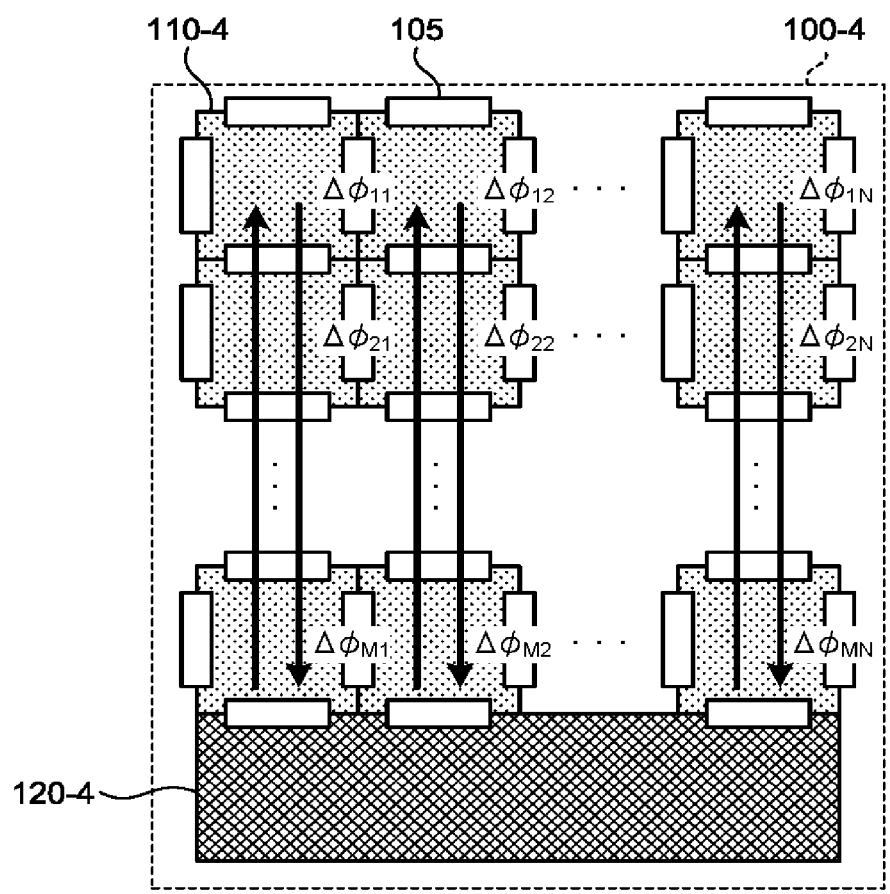
FIG. 8 is a view illustrating a configuration example of a wireless device of a fourth embodiment.

FIG. 8 is a view illustrating a configuration example of a wireless device 100-4 of the fourth embodiment. As illustrated in FIG. 8, the wireless device 100-4 includes a plurality of transmission/reception modules 110-4 and a controller 120-4.

A delay is generated in a signal transmitted/received by each of the transmission/reception modules 110-4 due to a wiring pattern on a connector 105 and the transmission/reception module 110-4. Delay amounts of signals from the controller 120-4 to the transmission/reception modules 110-4 are expressed as $\Delta\phi_{11}$ to $\Delta\phi_{MN}$ in FIG. 8.

The controller 120-4 further includes a function of correcting a phase of a signal in such a manner as to remove the phase differences $\Delta\phi_{11}$ to $\Delta\phi_{MN}$ between phases detected by the plurality of transmission/reception modules 110-4. A correction value with respect to each phase difference depends on a physical size or the like of a transmission/reception module 110-4. Thus, the controller 120-4 may determine a correction value based on a correction table in which a correction value for a phase difference is set. The correction table may be determined according to a physical size or the like of a transmission/reception module 110-4, for example, in mounting of the transmission/reception module 110-4.

Each of the transmission/reception modules 110-4 further includes a function of detecting a phase of a signal. The controller 120-4 calculates a phase difference between phases detected by transmission/reception modules 110-4 and corrects a phase of a signal based on the calculated phase difference. Each of the transmission/reception modules 110-4 may include a function of correcting a phase. For example, in a case where a previously-calculated correction value is used, a function of detecting a phase may not be included.

Note that an example of controlling transmission/reception modules 110-4 in each column similarly to the second embodiment is illustrated in FIG. 8. However, a method of the present embodiment can be applied to a case where paths of a signal are different, such as a form of a daisy chain connection (third embodiment). In a case where paths are different, the controller 120-4 only needs to correct a delay amount corresponding to the paths.

In such a manner, in the fourth embodiment, it becomes possible to correct a phase of a signal in such a manner that a phase difference generated by a difference in a wiring length or the like is removed. Also, a case where a reference signal is a low-frequency wave and has a fixed frequency is general. Thus, once correction is performed, it is not necessary to further update of a correction value. For example, a calculated correction value may be stored in storage or the like in a transmission/reception module 110-4 and the stored correction value may be used in subsequent processing.

Timing of detecting a phase of a signal and timing of correcting a phase difference may be any timing. For example, a phase may be constantly detected and the controller 120 may correct the phase in such a manner as to remove a phase difference in a case where the phase difference exceeds a predetermined threshold. With a function of detecting a phase, it becomes possible to calculate an appropriate correction value according to a change in environment, for example.

Example of Connector Structure

Next, an example of a structure of a connector will be described.

Figure 9:
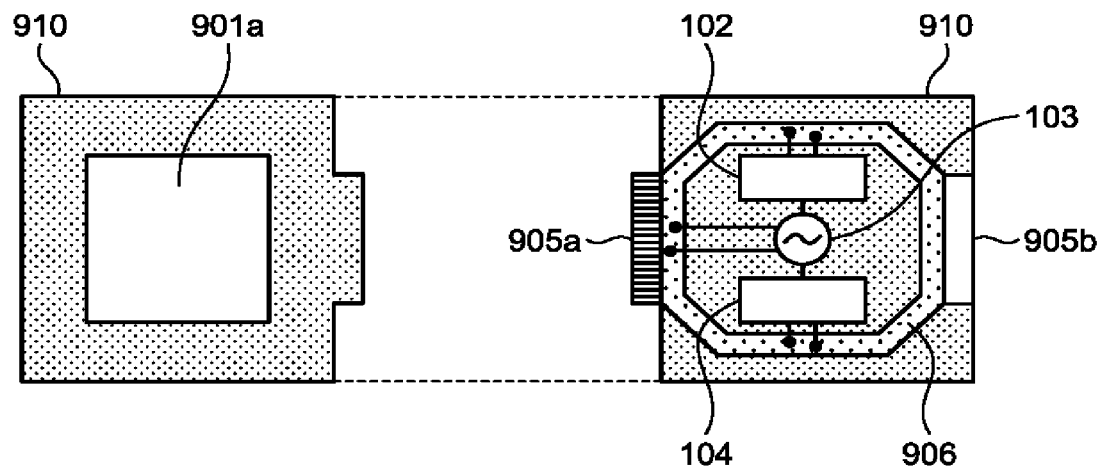
FIG. 9 is a view illustrating an example of a transmission/reception module.
Figure 10:
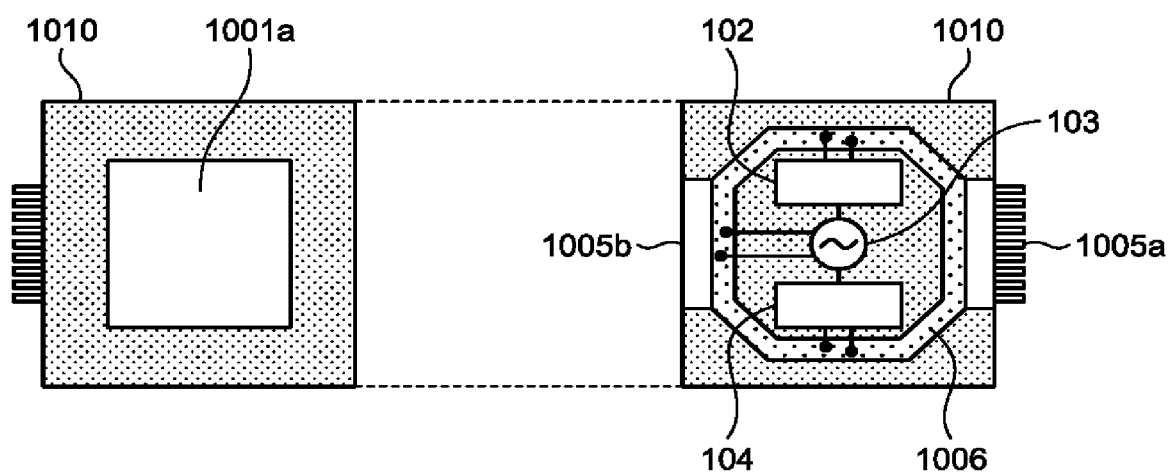
FIG. 10 is a view illustrating an example of a transmission/reception module.

FIG. 9 and FIG. 10 are views illustrating an example of a transmission/reception module including a connector that can be connected in series.

A transmission/reception module 910 illustrated in FIG. 9 includes a transmitter 102, a local oscillation signal generator 103, a receiver 104, an edge connector 905a, a connector 905b, and a signal path 906. The connector 905b is a connector that can be connected to the edge connector 905a.

A transmission signal, a reception signal, a reference signal, and the like transmitted/received by the transmitter 102, the local oscillation signal generator 103, and the receiver 104 are mainly supplied via the signal path 906 that connects the edge connector 905a and the connector 905b.

Components (such as transmitter 102, receiver 104, and local oscillation signal generator 103) included in each transmission/reception module 910 are mounted on a component surface of a mounting board. A radiation element 901a included in an antenna is mounted on a rear surface of the mounting board. The component surface and the rear surface are connected by a through-hole or the like.

A transmission/reception module 1010 illustrated in FIG. 10 includes a transmitter 102, a local oscillation signal generator 103, a receiver 104, a plug connector 1005a, a jack connector 1005b, and a signal path 1006. The jack connector 1005b is a connector that can be connected to the plug connector 1005a.

Similarly to FIG. 9, each signal is supplied via the signal path 1006 that connects the plug connector 1005a and the jack connector 1005b. Also, a radiation element 1001a included in an antenna is mounted on a rear surface of a mounting board.

Figure 11:
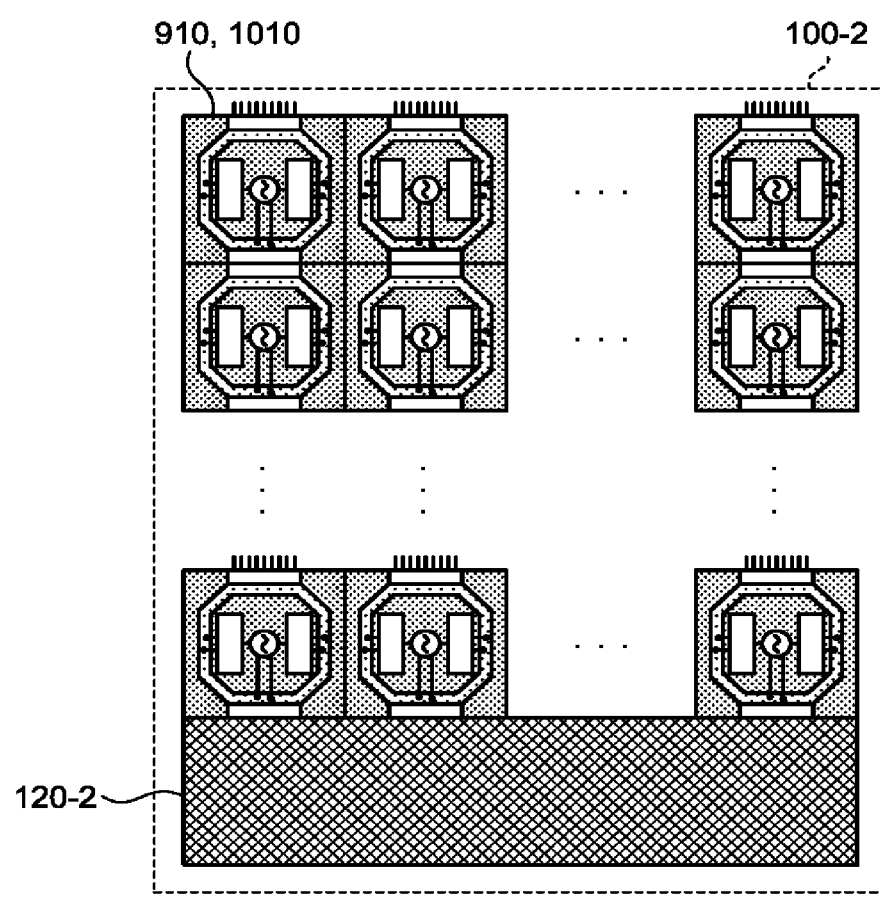
FIG. 11 is a view illustrating an example of applying the transmission/reception module in FIG. 9 or FIG. 10 to a wireless device.

FIG. 11 is a view illustrating an example of applying the transmission/reception module in FIG. 9 or FIG. 10 (transmission/reception module 910 or 1010) to the wireless device 100-2 of the second embodiment. As illustrated in FIG. 11, transmission/reception modules are connected by the edge connector 905a and the connector 905b, or the plug connector 1005a and the jack connector 1005b. At least one transmission/reception module is connected to the controller 120-2. A transmission signal, a reception signal, and a control signal can be controlled with respect to each column individually.

Figure 12:
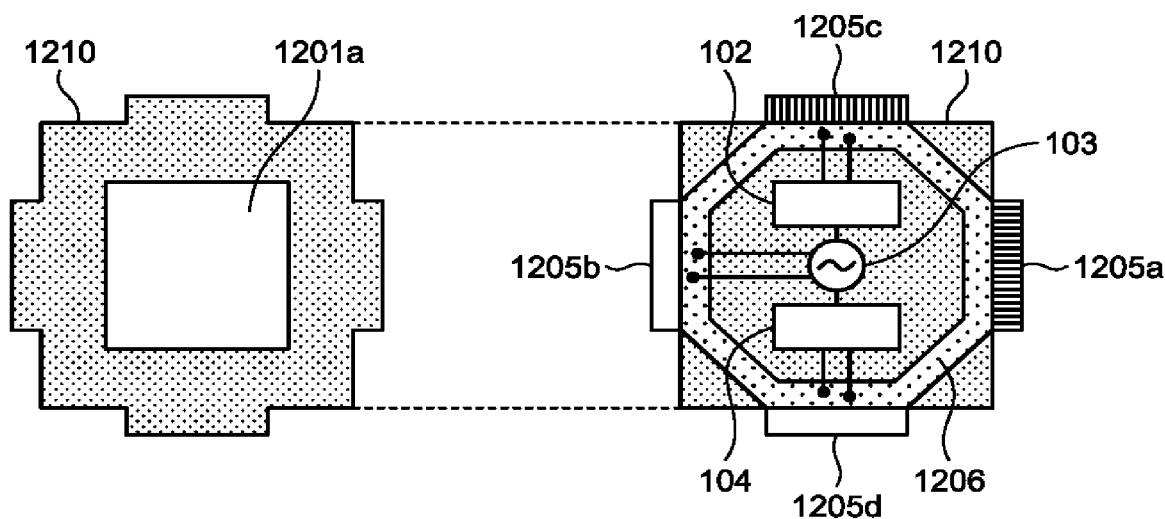
FIG. 12 is a view illustrating an example of a transmission/reception module.
Figure 13:
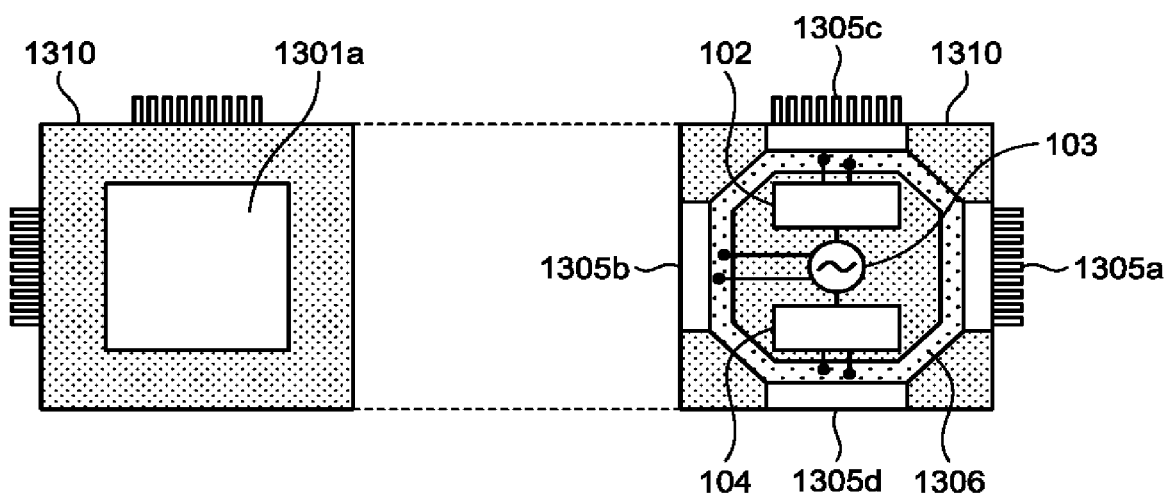
FIG. 13 is a view illustrating an example of a transmission/reception module.

FIG. 12 and FIG. 13 are views illustrating an example of a transmission/reception module including a connector that can be connected in series or in a daisy chain.

A transmission/reception module 1210 illustrated in FIG. 12 includes a transmitter 102, a local oscillation signal generator 103, a receiver 104, edge connectors 1205a, 1205b, 1205c, and 1205d, and a signal path 1206. The edge connectors 1205b and 1205d are connectors that can be connected to the edge connectors 1205a and 1205c.

A transmission signal, a reception signal, a reference signal, and the like transmitted/received by the transmitter 102, the local oscillation signal generator 103, and the receiver 104 are mainly supplied via the signal path 1206 that connects the edge connectors 1205a, 1205b, 1205c, and 1205d.

Components included in each transmission/reception module 1210 are mounted on a component surface of a mounting board. A radiation element 1201a included in an antenna is mounted on a rear surface of the mounting board. The component surface and the rear surface are connected by a through-hole or the like.

A transmission/reception module 1310 illustrated in FIG. 13 includes a transmitter 102, a local oscillation signal generator 103, a receiver 104, plug connectors 1305a and 1305c, jack connectors 1305b and 1305d, and a signal path 1306. The jack connectors 1305b and 1305d are connectors that can be connected to the plug connectors 1305a and 1305c.

Similarly to FIG. 12, each signal is supplied via the signal path 1306 that connects the plug connectors 1305a and 1305c and the jack connectors 1305b and 1305d. Also, a radiation element 1301a included in an antenna is mounted on a rear surface of a mounting board.

Figure 14:
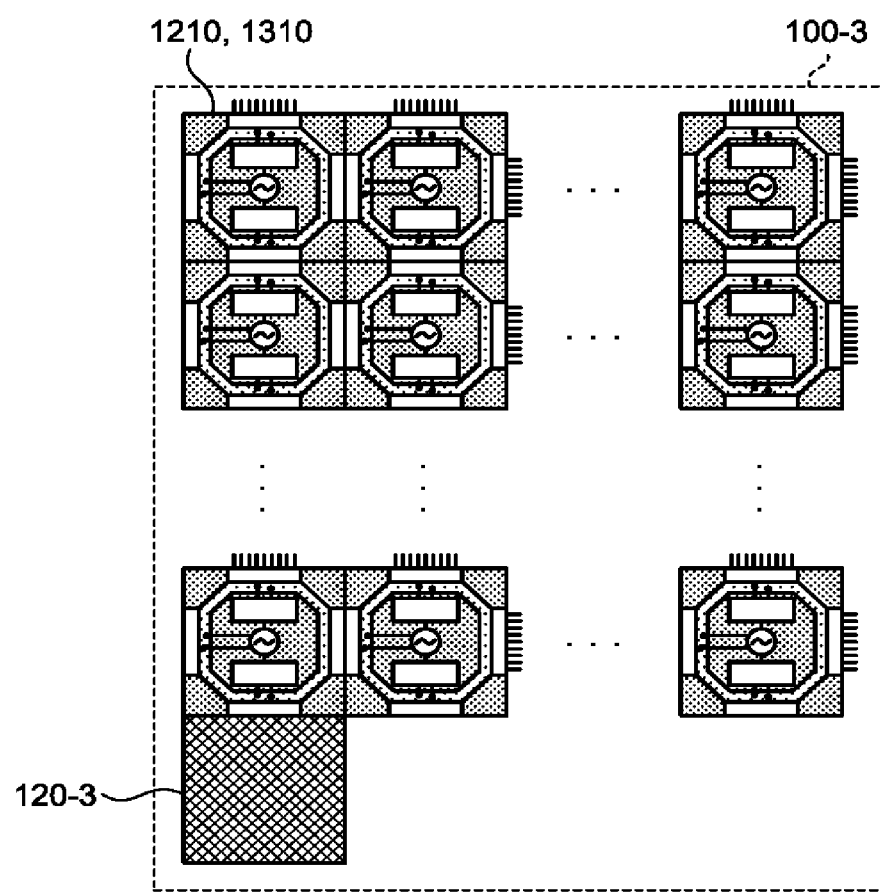
FIG. 14 is a view illustrating an example of applying the transmission/reception module in FIG. 12 or FIG. 13 to a wireless device.

FIG. 14 is a view illustrating an example of applying the transmission/reception module in FIG. 12 or FIG. 13 (transmission/reception module 1210 or 1310) to the wireless device 100-3 of the third embodiment. As illustrated in FIG. 14, transmission/reception modules are connected by the edge connectors 1205*a*, 1205*b*, 1205*c*, and 1205*d* or by the plug connectors 1305*a* and 1305*c* and the jack connectors 1305*b* and 1305*d*. At least one transmission/reception module is connected to the controller 120-3. A transmission signal, a reception signal, and a control signal are transmitted, for example, by a daisy chain connection.

FIG. 14 is a view illustrating an example of applying a transmission/reception module including a connector in FIG. 12 or FIG. 13 to the third embodiment. However, an applicable form is not limited to this. For example, the transmission/reception module in FIG. 12 or FIG. 13 may be applied to the second embodiment to enable individual control of a signal in each column.

Fifth Embodiment

In the above embodiment, a plurality of transmission/reception modules, and the transmission/reception modules and a controller are directly connected by a connector. In the fifth embodiment, units are connected via a base board.

Figure 15:
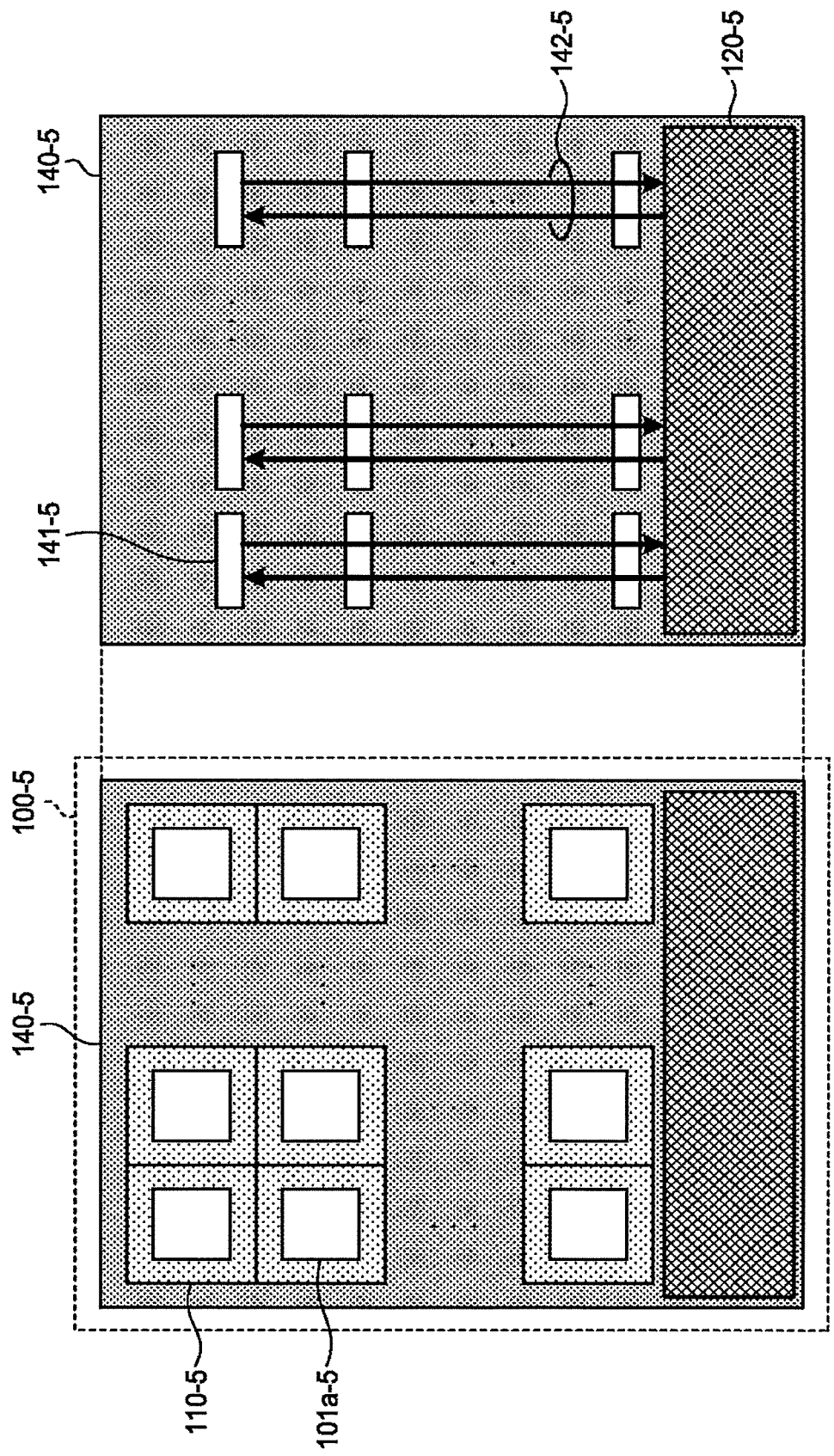
FIG. 15 is a view illustrating a configuration example of a wireless device of a fifth embodiment.

FIG. 15 is a view illustrating a configuration example of a wireless device 100-5 of the fifth embodiment. As illustrated in FIG. 15, the wireless device 100-5 includes a plurality of transmission/reception modules 110-5, a controller 120-5, and a base board 140-5.

At least two transmission/reception modules 110-5 are connected in array via a connector 141-5 mounted on the base board 140-5 and a connector 105-5 (described later) mounted on each of the transmission/reception modules 110-5. The connector 141-5 is used to give each signal 142-5 (such as transmission signal, reception signal, reference signal, different control signal, power signal, or ground potential) necessary for an operation of the transmission/reception modules 110-5.

In FIG. 15, an example in which the transmission/reception modules 110-5 are connected in each column is illustrated. The transmission/reception modules 110-5 may be connected in a daisy chain similarly to the third embodiment or may be connected by a different method.

Figure 16:
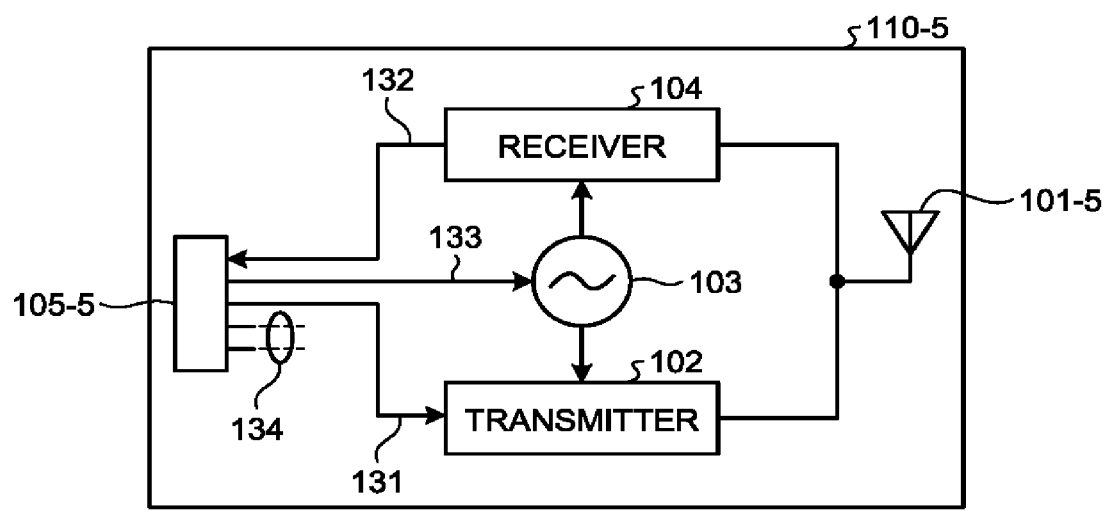
FIG. 16 is a view illustrating a configuration example of a transmission/reception module of the fifth embodiment.

FIG. 16 is a view illustrating a configuration example of a transmission/reception module 110-5 of the fifth embodiment. As illustrated in FIG. 16, the transmission/reception module 110-5 includes an antenna 101-5, a transmitter 102, a local oscillation signal generator 103, a receiver 104, and a connector 105-5.

In the fifth embodiment, the antenna 101-5 and the connector 105-5 are different from those of the first embodiment. The other configurations and functions are similar to those in FIG. 2 that is a block diagram of the wireless device 100 according to the first embodiment. Thus, the same sign is assigned and a description is omitted herein.

The antenna 101-5 includes a radiation element 101*a*-5. The connector 105-5 is a connector for connection with the connector 141-5 on the base board 140-5.

The controller 120-5 is connected to the connector 141-5 on the base board 140-5.

In such a manner, in the present embodiment, the transmission/reception module 110-5 is connected to the controller 120-5 via the connector 141-5 on the base board 140-5.

Note that in FIG. 15, an example in which the controller 120-5 is mounted on the base board 140-5 is illustrated. However, the controller 120-5 is not necessarily mounted on the base board 140-5.

The wireless device according to the fifth embodiment can also realize an effect similar to that of the wireless device of the first embodiment.

Modification Example

In the above embodiments, transmission/reception modules are arranged in a horizontally and vertically linear manner. However, an arranging method is not limited to this. For example, the following arranging method may be used.

Transmission/reception modules are arranged side by side only in one of vertical and horizontal directions.

Transmission/reception modules are arranged in such a manner of being deviated for a certain distance between adjacent rows and/or columns (for example, in zigzag).

A shape of a transmission/reception module is not necessarily square or rectangular and may be any shape. For example, a transmission/reception module may be polygonal, circular, or oval.

As described above, according to the first to fifth embodiments, it becomes possible to monitor a radio wave in a wide band.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless device comprising:
   a first transmitter and a second transmitter each of which transmit a wireless signal;
   a first receiver and a second receiver each of which receive a wireless signal; and
   a controller configured to control the first receiver to receive the wireless signal having a first frequency, and the second receiver to receive the wireless signal having a second frequency, wherein
   the controller further controls wireless power feeding by an electromagnetic wave based on a result of estimation of a coming direction or a propagation path of a received wireless signal that is received by the first receiver and the second receiver, the electromagnetic wave being transmitted by the first transmitter and the second transmitter.

2. The wireless device according to claim 1,
   wherein a frequency of a signal used for control by the controller is set in such a manner that no influence on the wireless signal is generated.

3. The wireless device according to claim 1, further comprising:
   a first generator to generate a signal having a frequency based on a first reference signal and being used for conversion of the frequency of the wireless signal that is transmitted/received by the first transmitter and the first receiver; and
   a second generator to generate a signal having a frequency based on a second reference signal and being used for conversion of the frequency of the wireless signal that is transmitted/received by the second transmitter and the second receiver, and
   the controller controls the first reference signal and the second reference signal.

4. The wireless device according to claim 1,
   wherein the controller corrects a phase difference between a first signal and a second signal, the first signal being used for control of the first transmitter and the first receiver, and the second signal being used for control of the second transmitter and the second receiver.

5. The wireless device according to claim 4, wherein
the first transmitter and the first receiver are included in a first module,
the second transmitter and the second receiver are included in a second module,
the first module detects phase of the first signal,
the second module detects phase of the second signal, and
the controller corrects a phase difference between the first signal and the second signal.

6. The wireless device according to claim 1, wherein
the first transmitter and the first receiver are included in a first module,
the second transmitter and the second receiver are included in a second module,
if the first module and the second module are classified into a same group, the first module or the second module is connected to the controller, and
if the first module and the second module are classified into different groups, the first module and the second module are connected to the controller.

7. The wireless device according to claim 1, wherein
the first transmitter and the first receiver are included in a first module,
the second transmitter and the second receiver are included in a second module, and
the first module and the second module are connected to the controller in a daisy chain.

8. The wireless device according to claim 1, wherein
the first transmitter and the first receiver are included in a first module,
the second transmitter and the second receiver are included in a second module,
the first module includes a first connector connected to at least one of the second module and the controller, and
the second module includes a second connector connected to at least one of the first module and the controller.

9. The wireless device according to claim 1, wherein
the first transmitter and the first receiver are included in a first module, and
the second transmitter and the second receiver are included in a second module,
the wireless device further comprising a base board including one or more connectors connected to at least one of the first module and the second module,
wherein at least one of the first module and the second module are connected to the controller via the connectors on the base board.

10. The wireless device according to claim 1, wherein
the first transmitter and the first receiver are included in a first module, and
the second transmitter and the second receiver are included in a second module,
first identification information is assigned to units the first module,
second identification information is assigned to the second module, and
the controller controls the first receiver included in the first module by using the first identification information, and controls the second receiver included in the second module by using the second identification information.

11. The wireless device according to claim 1, wherein the first transmitter, the first receiver, the second transmitter, and the second receiver are an integrated circuit.

* * * * *